No. 853,106. PATENTED MAY 7, 1907.
R. D. MERSHON.
ALTERNATING CURRENT APPARATUS.
APPLICATION FILED FEB. 1, 1904. RENEWED APR. 10, 1907.

3 SHEETS—SHEET 1.

Witnesses:
Raphaël Netter
S. S. Dunham.

Ralph D. Mershon, Inventor
by Kerr, Page & Cooper Attys.

No. 853,106. PATENTED MAY 7, 1907.
R. D. MERSHON.
ALTERNATING CURRENT APPARATUS.
APPLICATION FILED FEB. 1, 1904. RENEWED APR. 10, 1907.

3 SHEETS—SHEET 2.

Witnesses: Ralph D. Mershon, Inventor
Raphael Netter
A.S. Dunham. by Kerr, Page & Cooper Attys.

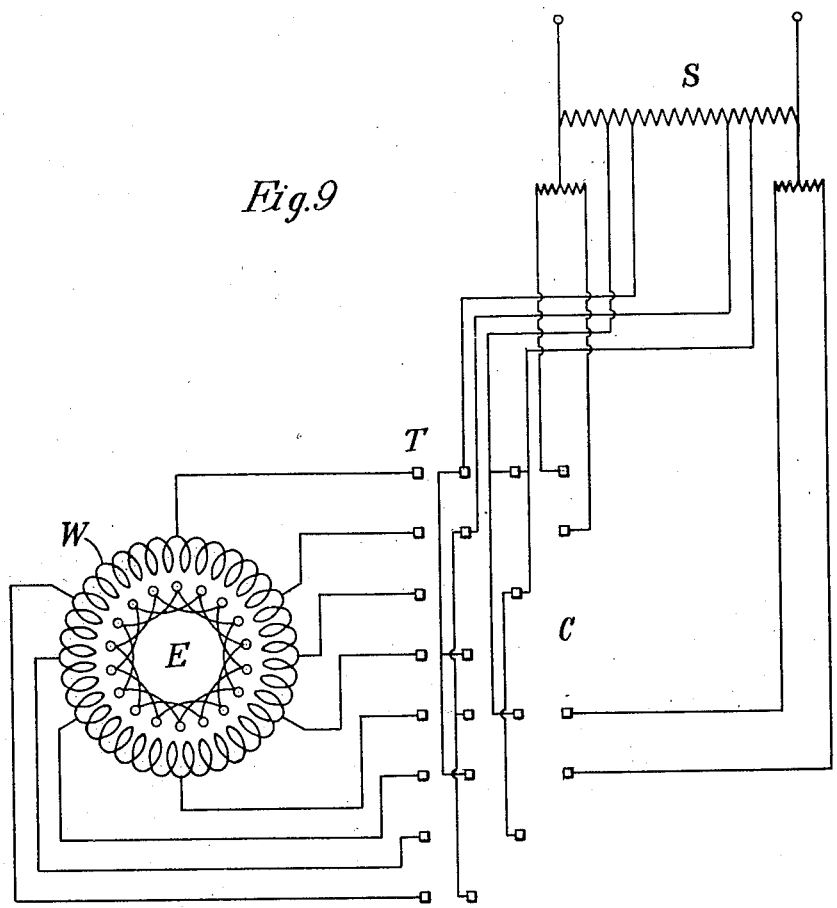

UNITED STATES PATENT OFFICE.

RALPH D. MERSHON, OF NEW YORK, N. Y.

ALTERNATING-CURRENT APPARATUS.

No. 853,106.  Specification of Letters Patent.  Patented May 7, 1907.

Application filed February 1, 1904. Renewed April 10, 1907. Serial No. 367,336.

*To all whom it may concern:*

Be it known that I, RALPH D. MERSHON, a citizen of the United States, residing at New York, in the county and State of New York, have invented certain new and useful Improvements in Alternating-Current Apparatus, of which the following is a specification, reference being had to the drawings accompanying and forming part of the same.

In my co-pending application, Serial Number 174,698, I have disclosed a method of obtaining a desired magnetic flux distribution, as, for example, a simple sine distribution or an approximation thereto, in electrical apparatus, and in another co-pending application, Serial Number 190,440, I have described a method of varying the speed of a motor while producing therein a desired flux distribution, or maintaining a distribution within certain limits of approximation to that desired. In the latter application there is also described a novel plan for constructing the apparatus so as to produce a desired flux wave, or a close approximation thereto, in the secondary circuit, although the flux distribution in the primary may be such that otherwise it would not produce in the secondary the desired wave or such close approximation thereto. The principle on which this plan is based is that the flux wave in the secondary circuits may be modified or varied according to the width of the electric arc embraced by those circuits; and the present invention therefore consists, broadly stated, in a motor in which the widths of the secondary circuits are proportioned for the purpose of modifying the flux wave therein.

For a more complete understanding of the invention I have shown in the accompanying drawing a typical embodiment, selecting for that purpose a secondary of the "squirrel cage" type. It should be understood, however, that the invention is not limited to such a construction, but may be embodied in other forms of whatever type.

Figure 1:
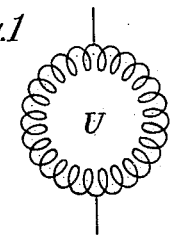
Figure 2:
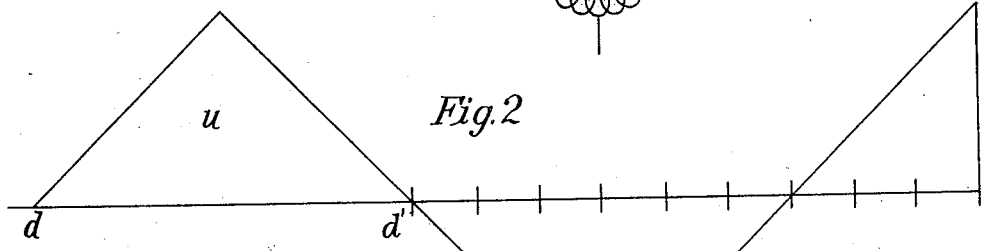
Figure 3:
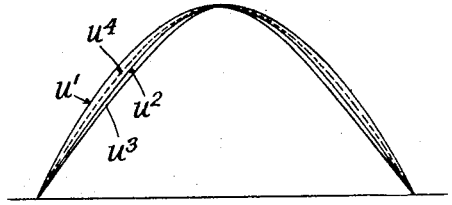
Figure 4:
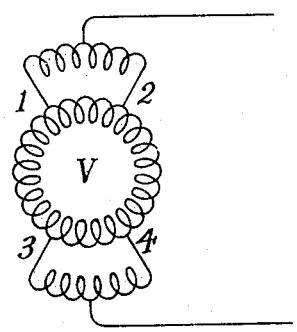
Figure 5:
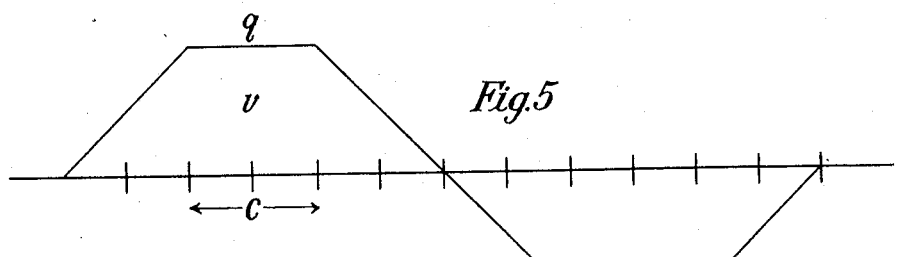

In the drawing, Figure 1 represents diagrammatically a two-pole motor, with one lead per pole, the two leads being 180° apart, and Fig. 2 shows the curve of the flux distribution therein. Fig. 3 shows the flux waves, produced by the flux distribution of Fig. 2, in secondary circuits of widths embracing 180°, 90°, and 60°, respectively. Fig. 4 represents diagrammatically a motor having two poles, produced by currents led in at two points per pole; Fig. 5 shows the flux distribution therein, and Fig. 6 the flux waves produced thereby in secondary circuits of 90°, 60°, and 30°, respectively. Fig. 7 represents a squirrel cage secondary as ordinarily constructed, and Fig. 8 one in which my present invention is embodied. Fig. 9 represents a motor in which the flux distribution may be varied and the number of poles made two, four or six, with a secondary element having circuits embracing 180 electrical degrees for the six pole connection, and 60 electrical degrees for the two pole connection.

Referring now to Fig. 1, U represents the winding of a two pole motor with one lead per pole, the leads being 180° apart. The resulting flux distribution in the motor will be as indicated by the curve $u$, in which electrical degrees are plotted on the horizontal axis, from $d$ to $d'$, being 180 degrees, and flux intensity on the vertical axis. The curves $u'$, $u^2$, $u^3$, Fig. 3, represent the flux waves generated by the flux distribution of curve $u$, in secondary coils whose widths are such that they embrace 180, 90 and 60 electrical degrees respectively. The points on the horizontal axis of these curves represent the positions of the middle points of their respective coils. These positions correspond to those, on the horizontal axis of the curve $u$, at which the flux intensity values represented by the ordinates of $u$ are measured. The vertical ordinates of $u'$, $u^2$ and $u^3$ represent not flux intensity as in $u$, but the total flux through the coils corresponding to the positions of their centers. In other words, if in the magnetic field of the motor U the flux distribution of which is represented by the curve $u$, we rotate an electric circuit whose width is 180°, the flux wave in this circuit will be the curve $u'$. If the width of the circuit is 90° the flux wave in it will be $u^2$, and of 60°, the curve $u^3$. The dotted curve, $u^4$, is a simple sine wave, assuming that this is the wave that it is desired to approximate.

It will be noted that the curve $u'$, for the 180° circuit, and $u^2$, for the 90°, fall on opposite sides of the sine wave $u^4$. This shows that for all arcs between 180° and 90°, the flux waves are closer approximations to the simple sine wave than is either $u'$ or $u^2$, and that somewhere between the arcs mentioned there is some width of circuit which will have in it a flux wave which is exactly, or which very closely approximates, a simple sine wave. This curve may be found by trial or calculation, but of course its determination is not necessary here.

So far I have spoken of the motor U, which has two poles, in which therefore, electrical degrees and degrees of arc are identical. The explanation already given in regard to the flux distribution wave, and the flux wave, will apply equally well to a motor with a greater number of poles, provided it be borne in mind in this case that the arcs mentioned are all electrical. In other words, if we should feed currents into the motor so as to produce four poles instead of two, the flux distribution curve $u$ would still be obtained, but the distance $d$—$d'$, instead of being 180 degrees of arc, would be 180 electrical degrees, which in the case of the four poles corresponds to 90 degrees of arc. It should also be borne in mind that if with the four-pole connection we have a secondary circuit embracing 180 electrical degrees and thus having in it a flux wave corresponding to $u'$, and that if we change from four poles to two poles, the same secondary circuit, which before embraced 180 electrical degrees, will then embrace only 90 electrical degrees, and will have in it the flux wave $u^2$. Also, if for the four-pole connection we employ that width of circuit between 180 and 90 electrical degrees which will give the close approximation to a simple sine flux wave as previously described, then on changing the number of poles to two the flux wave in this secondary will depart more from the simple sine wave than does $u^2$, because the secondary now embraces less than 90 electrical degrees.

Figure 6:
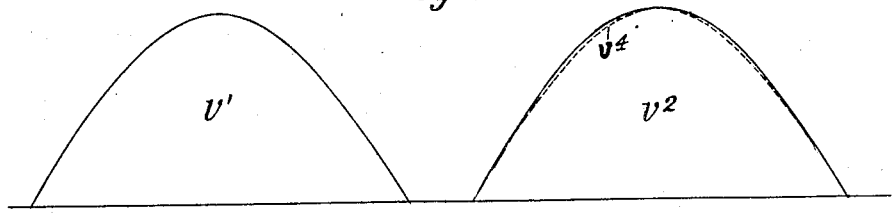
Figure 6:
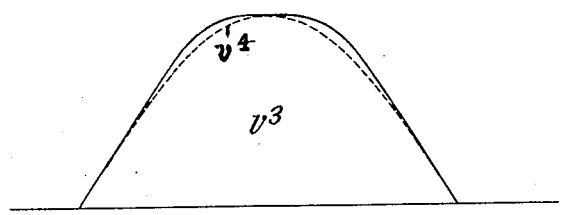
Figure 7:
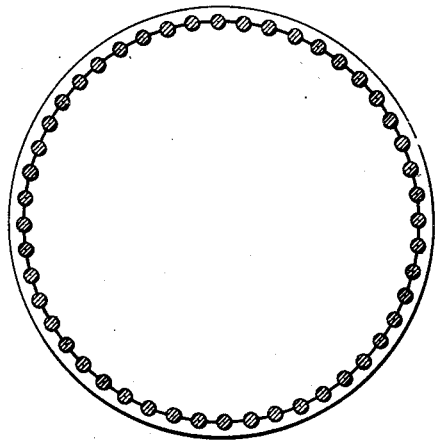

An explanation similar to that already given for Figs. 1, 2 and 3 will apply to Figs. 4, 5, and 6, but the latter represent conditions when two currents per pole are fed to the motor instead of one, as for example, in the motor V, so spaced that the resulting flux distribution is that shown by curve $v$. The corresponding flux waves for the distribution $v$, in secondary circuits embracing 90, 60 and 30 electrical degrees, are exemplified by curves $v'$, $v^2$, $v^3$, respectively. Here, as before, the dotted curve, $v^4$, represents the simple sine wave which it is desired to approximate. In the case of $v'$ the difference between the two is so small that they are practically coincident. It will be seen that $v^2$ also closely approximates a simple sine wave. It therefore follows that circuits of widths between 90 and 60 electrical degrees will have in them flux waves very close to the simple sine wave. Of course the curves $v'$, $v^2$, $v^3$ are equally representative for a greater number of poles, it being remembered, as before, that the arcs concerned are in every case electrical.

Fig. 7 represents a squirrel cage secondary element as it is ordinarily constructed, at the same time utilizing all the available copper space. The bars are all short circuited to a common ring, and the electrical arc of each circuit is therefore that corresponding to the peripheral distance between adjacent bars or conductors.

Figure 8:
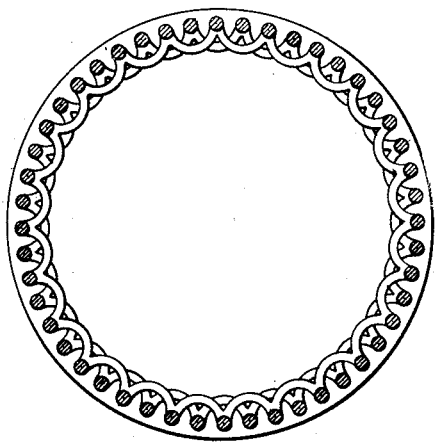

Fig. 8 shows a simple squirrel cage secondary in which the principle of my invention is embodied. Here alternate bars are connected, so that the electrical arc is twice that in Fig. 7, and the available copper space all utilized. By connecting every third bar the arc will be three times that of Fig. 7, and so forth. Any desired width of arc may therefore be obtained by a proper connection or spacing of the circuits, or both, as convenient.

It should be understood, of course, that instead of bars and their end connections we may use coils of any number of convolutions.

In Fig. 9 I have shown a system in which my invention is applied, the arrangement of the connections, leads, and controller being such as to give six, four and two poles in the motor. The stationary element of the motor, W, is shown as a uniformly distributed Gramme ring, though of course the kind of winding, whether ring or drum, uniformly or not uniformly distributed, is immaterial, per se, to the invention. It is also immaterial to the present invention how a given flux distribution is obtained or varied, when the production of a certain distribution or variation of distribution is desired, or how the poles are produced, or their number varied when such variation is desired. The leads to the motor are eight in number, as shown, brought out to contacts T. The single phase source of power is indicated by S, and a controller is diagrammatically illustrated at C. It will be seen on tracing out the connections that in the first position of the controller the motor will have six poles, with one lead per pole, in the second position will have four poles, also with one lead per pole, and in the third position will have two poles with two leads per pole. The secondary element E has its circuits so connected, as will be seen by tracing the conductors, that they embrace arcs of 180 electrical degrees when the motor is connected for six poles and they therefore have in them the flux curve for that arc shown in Fig. 3.

On changing to four poles the flux waves in these circuits will be those corresponding to 120°, and will, therefore lie between $u'$ and $u^2$, Fig. 3, and will be nearer the sine wave than either of the latter; and on changing to two poles the flux wave will be that corresponding to curve $v^2$ of Fig. 6. If instead of feeding in the current at two points per pole in the two pole connections it had been led in at only one point per pole, as before, the resulting flux wave would have been that of $u^3$, Fig. 3, which for the purpose of this explanation we will consider as too great a departure from the approximation to a sine wave which we are endeavoring to maintain, it being also assumed for this explanation that the flux waves for the other two connections do not exceed the limits of allowable departure from the sine flux wave. Hence on changing to the two pole connection we also modify the flux distribution in the primary to produce another and better flux wave in the secondary. For a polyphase motor the sets of leads for each pole would be repeated for each phase introduced into the motor by a set of leads with the common use of some or all of them for different phases.

The system just described exemplifies one of the most important advantages of the invention. It will be noted that if the secondary in Fig. 9 were connected in the ordinary way, the flux wave therein when the number of poles is six would not fall between $u'$ and $u^2$, but would be $u^3$, more nearly approximating in form the distribution curve $u$, Fig. 2. To produce a better wave it would therefore be necessary to modify the flux distribution by leading in the current or currents at two or more points per pole, thus requiring at least twelve leads for the six poles. On changing to four poles and to two poles the flux waves would be still closer approximations to the distribution curve $u$, and a plurality of leads per pole would still be required. But by properly proportioning the widths of the secondary circuits according to my invention, we are able to obtain a good wave in those circuits with only one lead per pole in both the six and the four pole connections, the two leads per pole becoming necessary, in this particular case, only in the two pole connection. We are therefore able to materially reduce the total number of leads to the motor.

Other systems in which my present invention is embodied might be illustrated, but the principle of the invention will be readily understood from the explanation already given. One instance in which the invention will be of particular value is that of a slow speed motor, in which it is ordinarily difficult or impossible to secure a good flux distribution on account of the large number of poles and consequently few coils or turns per pole in the primary winding. By properly proportioning the widths of the secondary circuits, however, in accordance with my invention, the flux wave in these circuits may be greatly improved.

What I claim is:

1. In alternating current apparatus, the combination with the primary element and means for varying the number of poles therein, of a secondary element having the width of its circuits proportioned, as to the arcs embraced thereby, to produce a predetermined flux wave therein with the magnetic flux distribution in the primary for one of the possible number of poles, as set forth.

2. In alternating current apparatus, the combination with the primary element, means for producing different numbers of poles therein and means for producing a given magnetic flux distribution in the primary for one of the possible numbers of poles, of a secondary element having the width of its circuits proportioned, as to the arcs embraced thereby, to produce a predetermined flux wave therein with the given flux distribution in the primary, as set forth.

3. In alternating current apparatus, in combination, a primary element, means for producing different numbers of poles therein, means for producing a given magnetic flux distribution in the primary with a particular number of poles, a secondary element having the width of its circuits proportioned as to the arcs embraced thereby to produce a predetermined flux wave therein with the given flux distribution, and means for varying the flux wave in the secondary, as set forth.

4. In alternating current apparatus, in combination, a primary element, means for producing different numbers of poles therein, means for producing a given magnetic flux distribution in the primary with a particular number of poles, a secondary element having the width of its circuits proportioned as to the arcs embraced thereby to produce a predetermined flux wave therein with the given flux distribution, and means for varying the flux distribution in the primary, as set forth.

5. In alternating current apparatus, in combination, a primary element, means for producing a particular number of magnetic poles therein, means for producing a given magnetic flux distribution in the primary with the particular number of poles, a secondary element having the width of its circuits proportioned as to the arcs embraced thereby to produce a predetermined flux wave therein with the given flux distribution in the primary for the particular number of poles, means for varying the number of poles in the primary, and means for varying the flux distribution in the primary, as set forth.

6. In alternating current apparatus, in combination, a primary element, means for producing a particular number of poles therein, means for producing a given magnetic flux distribution in the primary for the particular number of poles, a secondary element having the width of its circuits proportioned as to the arcs embraced thereby to produce a predetermined flux wave therein with the given flux distribution in the primary for the particular number of poles, means for varying the number of poles in the primary and means for simultaneously varying the flux distribution in the primary, as set forth.

7. In alternating current apparatus, in combination, a primary element, means for producing a particular number of poles therein, means for producing a given flux distribution in the primary with the particular number of poles, a secondary element having the width of its circuits proportioned as to the arcs embraced thereby to produce a predetermined flux wave therein with the given flux distribution in the primary for the particular number of poles, means for varying the number of poles in the primary, and means for restoring the flux wave to that predetermined, or a close approximation thereto, as set forth.

8. In an alternating current motor, in combination, a primary winding or windings, supply leads thereto to produce a particular number of poles therein and a given magnetic flux distribution, a secondary element having the width of its circuits proportioned, as to the arcs embraced thereby, to produce a predetermined flux wave in such circuits with the given flux distribution in the primary for the particular number of poles, and means for varying the number of poles by varying the points of connection of the supply leads, as set forth.

9. In an alternating current motor, in combination, a primary winding or windings, supply leads thereto to produce a particular number of poles therein and a given flux distribution, a secondary element having the width of its circuits proportioned as to the arcs embraced thereby to produce a predetermined flux wave therein with the given flux distribution in the primary, and means for varying the number of poles in the primary by leading in current or currents thereto at a plurality of points per pole, the number of points being chosen to give a flux distribution with the new number or numbers of poles which will maintain the flux wave in the secondary the same or within predetermined limits of departure therefrom, as set forth.

10. In an alternating current motor, in combination, a primary winding or windings, supply leads thereto to produce a particular number of poles therein and a given flux distribution, a secondary element having the width of its circuits proportioned, as to the arcs embraced thereby, to produce a predetermined flux wave therein with the given flux distribution in the primary, and means for varying the number of poles in the primary by leading in current or currents thereto at different points and with different numbers of points per pole, the number of points per pole being chosen to give a flux distribution with the new number or numbers of poles which will produce in the secondary the predetermined flux wave or a desired approximation thereto, as set forth.

11. In an alternating current motor, in combination, a primary winding or windings, supply leads thereto to produce a particular number of poles therein and a given magnetic flux distribution, a secondary element having the width of its circuits proportioned, as to the arcs embraced thereby, to produce a predetermined flux wave therein with the given flux distribution in the primary, and means for varying the number of poles in the primary by leading in current or currents thereto at different points a plurality of points per pole, whereby the flux distribution in the primary will be maintained the same or a close approximation thereto, as set forth.

12. In an alternating current motor, in combination, a primary element, means for producing different numbers of poles therein, a secondary element having the width of its circuits proportioned as to the arcs embraced thereby to produce a flux wave therein for each of the said numbers of poles which shall fall within predetermined limits, means for producing other number or numbers of poles, and means for varying the magnetic flux distribution in the primary with the new number or numbers of poles to vary the flux wave in the secondary, as set forth.

13. In an alternating current motor, in combination, a primary element, means for producing different numbers of poles therein, a secondary element having the width of its circuits proportioned as to the arcs embraced thereby to produce a flux wave therein for each of the said numbers of poles which shall fall within predetermined limits, means for producing other number or numbers of poles, and means for varying the magnetic flux distribution in the primary with the new number or numbers of poles to maintain the flux wave in the secondary within said predetermined limits, as set forth.

RALPH D. MERSHON.

Witnesses:
S. S. DUNHAM,
G. B. LEWIS.